United States Patent [19]

Cook

[11] 3,942,293

[45] Mar. 9, 1976

[54] METAL OXIDE COATED REFRACTORY BRICK

[75] Inventor: Richard S. Cook, New Martinsville, W. Va.

[73] Assignee: PPG Industries, Inc., Pittsburgh, Pa.

[22] Filed: Mar. 15, 1973

[21] Appl. No.: 341,418

Related U.S. Application Data

[62] Division of Ser. No. 182,138, Sept. 20, 1971, Pat. No. 3,813,225, which is a division of Ser. No. 805,822, March 10, 1969, abandoned.

[52] U.S. Cl. .................. 52/232; 52/596; 52/415; 266/43
[51] Int. Cl.² ........................................ B01J 1/20
[58] Field of Search ............ 52/596, 415, 612, 232; 110/1 A; 266/43

[56] References Cited

UNITED STATES PATENTS

| | | | |
|---|---|---|---|
| 2,293,089 | 8/1942 | Wainer | 52/612 |
| 2,713,787 | 7/1955 | Rose | 52/612 |
| 3,179,526 | 4/1965 | Dolph | 266/43 X |
| 3,203,785 | 8/1965 | Knuppel | 266/43 |

*Primary Examiner*—John E. Murtagh
*Attorney, Agent, or Firm*—Irwin M. Stein

[57] ABSTRACT

Refractory brick that is treated with refractory metal oxide powder, e.g., titanium oxide, is used as a reactor lining. Joints between a dry assembly of refractory brick are filled with refractory metal oxide powder.

4 Claims, No Drawings

METAL OXIDE COATED REFRACTORY BRICK

This is a division of application Ser. No. 182,138, filed Sept. 20, 1971, now U.S. Pat. No. 3,813,225 which is division of application Ser. No. 805,822 filed Mar. 10, 1969 now abandoned.

BACKGROUND OF THE INVENTION

Refractory brick is used commonly to line the interior surfaces of vessels within which high temperatures are generated and/or within which an atmosphere corrosive to metals is found. The type of refractory brick employed in such vessels varies with the function of the vessel. For example, refractory brick used for ceramic kilns and furnaces differs from that used in blast furnaces and fluidized-solids reactors. In the last mentioned vessels, refractory brick typically is resistant to both high temperatures and a corrosive or erosive atmosphere resulting from chemical reaction and movement of material within the vessel. A typical example of the latter type vessel is a fluidized-solids chlorination reactor wherein metallic chlorides are produced by treatment of a particulate ore with gaseous chlorine at elevated temperatures.

Conventionally, the refractory lining of a reaction vessel is fabricated from several courses (rows) of refractory brick bonded together with a bonding mortar compatible with the brick. Typically, the mortar is prepared with water. When the refractory lining is dried, most of the water in the mortar is removed. However, a small quantity of water remains in the mortar either as water of hydration, or as chemically uncombined water. In vessels wherein a chlorination reaction is conducted, the presence of such water produces a deleterious effect on the refractory brick and metal shell. For example, in such a chlorination vessel, hot gaseous chlorine will combine with water to form hydrochloric acid. The hydrochloric acid attacks the refractory brick and metal shell causing severe deterioration of these materials, particularly within the inner courses of brick comprising the vessel lining. Such deterioration can cause premature shutdown of the process conducted within the vessel and expensive replacement of the refractory brick lining.

It has been proposed to protect refractory linings by coating the surface of the refractory brick exposed to the interior of the vessel containing the lining with various materials. See, for example, U.S. Pat. No. 1,576,021 (metallic aluminum coating), U.S. Pat. No. 2,336,366 (metallic nickel or nickel alloy), U.S. Pat. No. 2,746,888 (metallic titanium or titanium alloy), U.S. Pat. No. 3,203,785 (viscous aluminasilica mixture), and U.S. Pat. No. 3,330,627 (glazed vitrious silica). Such techniques are expensive and most require special equipment.

It has also been suggested to fabricate refractory linings without utilizing mortar, i.e., laying-up the brick dry. However, this procedure requires machining of the refractory brick to very close tolerances in order to provide a lining which is both structurally sound and impervious to the outside atmosphere and the contents, e.g., gases, solids and liquids, within the vessel. The latter requirement prevents the egress of the contents of the vessel, especially gas charged to or generated within the vessel, to the shell of the vessel and to the atmosphere. Use of the aforesaid dry assembly of refractory brick has not proven to be entirely successful. In chlorination vessels, for example, gaseous chlorine charged to the vessel seeps through the interstices between the refractory brick and is lost to a recovery or waste system. In commercial fluidized bed chlorinators, such loss can be substantial and not only increases chlorine recovery costs but also poses a potential health hazard.

BRIEF SUMMARY OF THE INVENTION

It has now been discovered that the life of refractory brick can be prolonged by applying finely-divided refractory metal oxide having a melting point greater than the operating temperature of the vessel to the surfaces of the brick in an amount sufficient to fill substantially all of the surface pores of the brick. In a preferred embodiment, a superficial coating of the metal oxide is also applied to one or more hidden faces of the brick. It has further been found that a substantially impermeable assembly of refractory brick can be fabricated without a conventional bonding mortar, i.e., dry, by filling the joints between the refractory brick, i.e., the space between, adjacent, or abutting brick surfaces, with said refractory metal oxide powder.

DETAILED DESCRIPTION

The present invention relates to a method of prolonging the life of refractory brick, to the brick produced by the use of said method, and to a dry assembly of such brick. The hereindescribed method and refractory brick are particularly applicable to chlorination vessels and are especially useful in fluidized bed chlorinators. Although the present invention will be discussed hereinafter with respect to such chlorination vessels, it should be understood that the present invention is applicable to any refractory brick lined vessel wherein the atmosphere within the vessel during operation of the process conducted therein causes deterioration of the refractory brick lining.

Conventionally, chlorination vessels are constructed of a metal, e.g., steel, cylindrical shell lined with several courses (rows) of refractory brick. Subdivided ore or concentrate, usually with a carbonaceous reducing agent, is fed into the vessel through the top or through a side port and chlorine is fed into the vessel through the bottom. The chlorine entry and ore feeds can be arranged to produce a fluidized bed in which the ore and carbonaceous particles are suspended and agitated in the upwardly moving chlorine gas flow during the chlorination reaction. Chlorination is conducted at elevated temperatures, often in the range of from 1500° F. to 2000° F. Metallic chloride is produced as a vapor together with gaseous by-products and these gases are withdrawn from the vessel and the metallic chloride products separated, condensed and purified for appropriate use. A typical example of the aforementioned process is the chlorination of a titaniferous ore, e.g., rutile $TiO_2$, in the presence of coke to produce titanium tetrachloride. Titanium tetrachloride is a well-known commercial product and is useful in the production of titanium metal and titanium oxide pigments.

In a typical fluidized bed chlorinator for the chlorination of titaniferous ore, about 30 to 50 percent of the height of the chlorinator is occupied by the fluid bed and is usually termed the working or fluid bed section. The remaining portion of the chlorinator is usually referred to as the disengaging section. In the working section of the chlorinator, the chlorine, titaniferous ore and carbon undergo chemical reaction to form, principally titanium tetrachloride, carbon dioxide and carbon monoxide. Other metal halides, e.g., iron chlorides, depending on the chemical composition of the ore, are also formed. The portion of the working section where chlorination occurs, i.e., where formation of the metal chlorides principally takes place, is the oxidation section, i.e., the atmosphere is oxidative in character. The remaining portion of the chlorinator principally has a reducing atmosphere due to the presence of substantial quantities of carbon dioxide and carbon monoxide, and, the substantial absence of chlorine.

The refractory brick lining of a fluid bed chlorinator is subjected to corrosive attack by the hot gases within the chlorination vessel, e.g., chlorine, carbon monoxide and carbon dioxide, and also to erosion caused by the action of the bed against the refractory brick. Typically, adjacent refractory brick are bonded together with a bonding mortar which even after drying contains residual water. The hot chlorine and/or titanium tetrachlorine within the vessel combines with residual water in the mortar to form hydrochloric acid. At the temperatures of operation, hydrochloric acid is extremely corrosive to the refractory brick. It attacks the mortar and the brick causing a condition known as corrosion. Often, the corrosion is more severe on the internal courses of brick than at the surface of the brick exposed to the interior of the chlorination vessel. If corrosion is severe enough, the hydrochloric acid can also reach and attack the steel sheel of the chlorinator.

It is, therefor, necessary that refractory linings of chlorination vessels and other vessels reflecting similar operating conditions be both corrosion and erosion resistant. Further, the refractory lining must provide sufficient thermal insulation so that the exothermic heat of reaction or added heat is conserved to sustain substantially uniform operating temperatures for extended periods of steady state operation. Typically, therefore, chlorination vessel refractory linings are fabricated with one or more layers of insulating refractory brick adjacent to the steel shell and one or more inner layers of refractory brick adjacent to the insulating refractory brick and the working interior of the chlorination vessel.

Because of the water content of the bonding mortar utilized to cement refractory brick together, typically about 14 weight percent, and the corrosion difficulties resulting therefrom, it has been suggested that refractory brick be laid-up dry, i.e., without using any mortar. However, such fabrication requires machining of refractory brick to very close tolerances (a costly procedure); and, even then, does not succeed in providing an over-all interior surface that is substantially impervious to gas.

In accordance with the present invention, at least one surface of refractory brick is treated with a refractory metal oxide so that substantially all of the exposed surface pores or voids are filled with the metal oxide. In addition, and preferably, a superficial coating of the refractory metal oxide is placed on the surface of the brick. Preferably, the hidden faces of the refractory brick, i.e., faces not exposed to the interior of the chlorination vessel, are treated and/or coated with refractory metal oxide. Refractory brick treated, as described, can be dry assembled and the joints between bricks filled (grouted) with refractory metal oxide to produce a substantially gas impervious refractory lining.

It has been found that an assembly of refractory brick, as heretofore described, retards the seepage of gas from the interior of the chlorination vessel through the interstices between the refractory brick and the brick per se, and substantially prevents deterioration of the internal courses of refractory brick. The manner in which deterioration is prevented is not exactly known; however, it is presumed that the permeability of the brick is reduced sufficiently to prevent carbon monoxide and chlorine gas from reaching the internal courses of brick.

The present invention is applicable to newly constructed chlorination vessels, as well as existing chlorination vessels. In the latter case, as a course of refractory brick, or a portion thereof, is replaced, replacement is made in accordance with the hereindescribed method. For example, if the course of refractory brick exposed to the interior of the chlorination vessel, i.e., the working course, is to be replaced, refractory metal oxide can be applied to the exposed face of the abutting course of brick, as well as to one or more hidden faces of the refractory brick being replaced. Once the brick to be replaced is in position, any unfilled joints between the brick can be filled with the refractory metal oxide. The brick face exposed to the interior of the vessel is usually not covered with a coating of the refractory metal oxide for the reason that the metal oxide placed on this face is usually removed by erosion or chemical combination from contact with the contents of the vessel, e.g., the fluid bed and hot reacting gases. In addition, scale typically builds up on the hot face of the brick comprising the working course after a period of operation. However, if desired, the exposed surface voids of this face can be filled with the metal oxide to aid in reducing the porosity of the brick.

In like manner, should the working course of refractory brick as well as several inner courses of brick, or any portion thereof require replacement, each refractory brick replacement can be treated with the refractory metal oxide in the manner described herein as it is replaced in the refractory wall. When an inner course of refractory brick is replaced, it is preferred that all of its faces be treated with the refractory metal oxide.

In fabricating complete refractory linings for either a newly constructed chlorination vessel or a reconstructed chlorination vessel in accordance with the present invention, various techniques can be used. Exemplary of some techniques that can be used, alone or in any combination are: (1) constructing an inner row of brick; grouting the interstices between the brick with metal oxide; and, applying a surface coating of metal oxide to the remaining exposed faces, (2) constructing an inner row of brick using refractory metal oxide on abutting surfaces instead of the conventional bonding mortar; and, applying a surface coating of metal oxide to the remaining exposed faces, (3) treating each refractory brick by filling the exposed pores or voids on each face with metal oxide and/or applying a superficial coating of metal oxide to each face; constructing an inner row of brick with said treated brick; grouting the interstices between the brick with metal oxide; and applying additional metal oxide to the remaining exposed faces in a thin layer to insure that all brick surfaces are covered, and (4) coating the metal shell with metal oxide to fill any gaps that occur between the shell and the first row of brick and then construct the refractory wall using any one or more of the preceding three techniques.

Whichever technique is used to construct an inner row of refractory brick, the technique is repeated on subsequent rows of brick until the last row or working course of brick is reached. The exact number of rows of brick will vary with the particular reaction vessel and, therefore, the number of bricks and rows of brick treated in accordance with the present method does not represent a critical feature of the present invention. As indicated above, the working face of brick is usually not treated with a superficial layer of metal oxide because such layer is quickly removed by the reactor environment.

As used herein, the term "refractory brick" is intended to mean and include all types of bricks fabricated from non-metallic materials used in the construction or lining of furnaces or other vessels operated at high temperatures and/or within which an atmosphere corrosive to metals is found. Exemplary of the type of bricks contemplated are fire-clay, high alumina, silica, silicon-carbide, zircon and basic, e.g., magnesite, chrome, magnesite-chrome, chrome-magnesite, and forsterite. The compositions of each of the aforesaid types of brick vary within each class and depend on the ultimate use to which the brick is to be put. Typical compositions of each of the grades of each of the aforementioned brick and their methods of preparation are known in the art and can be obtained by reference to any standard refractory text. Such a text is *Modern Refractory Practice*, 4th Edition, copyright 1961 by the Harbison-Walker Refractories Company. The portions of that text relating to the compositions, e.g., pp. 134, 135, 291 and 292, and methods of preparation of said refractory brick are incorporated herein by reference.

Refractory bricks are fabricated in a variety of shapes and sizes. For example, the various shapes include: rectangular sizes (such as straights, soaps and splits); tapered sizes having only plane surfaces (such as arch, wedge, and key brick); neck skew, feather edge, and jamb brick; and tapered sizes having two curved surfaces (circle brick, cupola blocks and rotary kiln blocks). A discussion and representation of such shapes and sizes can be found on pages 477—479 of the aforesaid text, *Modern Refractory Practice*. Most of the standard refractory brick shapes have six sides or faces. Jamb brick has five sides, one side being curved, thereby occupying two sides of a normally rectangular brick.

In accordance with one embodiment of the present method, an assembly of refractory bricks are dry assembled and the interstices or joints between the bricks filled with refractory metal oxide. In another embodiment, at least one face, advantageously the hot face, of the refractory brick is treated with refractory metal oxide in an amount sufficient to fill substantially all of the exposed surface pores of the brick and thereby reduce its porosity or permeability. Preferably, at least $(n-1)$ faces of the brick are thus treated. The letter $n$ in the expression $(n-1)$ represents the total number of faces (sides) possessed by the brick. Typically, $n$ will be 5 or 6. More preferably, all of the faces of the brick are treated with metal oxide. In a still further embodiment, a superficial coating of metal oxide is placed on at least one hidden face of the refractory brick, typically the hot face, and, preferably, such a coating is placed on all hidden brick faces.

The refractory metal oxide utilized to treat the refractory brick in accordance with the method of the present invention is any refractory metal oxide having a melting point greater than the operating temperature of the vessel. Preferably, the refractory metal oxide will also have some chemical resistance to the atmosphere, e.g., reducing, oxidative, basic and acidic, to which it is exposed and be compatible with the refractory brick with which it is used. For example, chemical resistance should be sufficient to permit the operation of the process within the vessel containing the refractory lining for a reasonable length of time, i.e., until a scheduled shutdown or for a normal process run. The exact length of time will vary from reactor to reactor and process to process. In the case of metal oxide used for inner courses of brick, chemical resistance may not be required since the metal oxide may never be physically exposed to the atmosphere within the vessel.

The operating temperature of the vessel is intended to mean the highest temperature reached within the vessel, e.g., a fluid bed chlorinator, during continuous operation of the process conducted, e.g., chlorination, in the vessel. Absent hot spots, this temperature will usually be the highest temperature within the vessel under steady state operating conditions. In the case of a fluidized bed chlorination vessel utilized for the chlorination of titaniferous ores, the operating temperature of the vessel is typically greater than 1600° F., and usually less than 1900° F.

Exemplary of refractory metal oxides that have melting points sufficiently high to be considered useful in the method of the present invention include: aluminum oxide ($Al_2O_3$), barium oxide (BaO), beryllium oxide (BeO), calcium oxide (CaO), cerium oxide ($CeO_2$), chromic oxide ($Cr_2O_3$), cobalt oxide (CoO), gallium oxide ($Ga_2O_3$), hafnium oxide ($HfO_2$), lanthanum oxide ($La_2O_3$), magnesium oxide (MgO), manganese oxide (MnO), nickel oxide (NiO), niobium oxide ($Nb_2O_3$), silicon oxide ($SiO_2$), strontium oxide (SrO), tantalum oxide ($Ta_2O_5$), thorium oxide ($ThO_2$), tin oxide ($SnO_2$), titanium oxide ($TiO_2$), uranium oxide ($UO_2$), vanadium oxide ($V_2O_3$), yttrium oxide ($Y_2O_3$), zinc oxide (ZnO), zirconium oxide ($ZrO_2$), and mixtures of refractory metal oxides.

Exemplary of complex oxides that are useful in the present invention include: aluminum silicate (mullite - $3Al_2O_3 . 2SiO_2$), aluminum titanate ($Al_2O_3 . TiO_2$ or $Al_2O_3 . 2TiO_2$), barium aluminate (BaO . $Al_2O_3$ or BaO . $6Al_2O_3$), barium silicate (2BaO . $SiO_2$), barium zirconate (BaO . $ZrO_2$), beryllium aluminate (BeO . $Al_2O_3$), beryllium silicate (BeO . $SiO_2$ or 2BeO . $SiO_2$), beryllium titanate (3BeO . $TiO_2$), beryllium zirconate (3BeO . $2ZrO_2$), calcium chromate (CaO . $CrO_3$), calcium chromite (CaO . $Cr_2O_3$), calcium phosphate (3CaO . $P_2O_5$), calcium silicate 3CaO . $SiO_2$ or 2CaO . $SiO_2$), calcium silicon phosphate (5CaO . $SiO_2 . P_2O_5$), calcium titanate (CaO . $TiO_2$ or 2CaO . $TiO_2$ or 3CaO . $TiO_2$), calcium zirconate (CaO . $ZrO_2$), cobalt aluminate (CoO . $Al_2O_3$), magnesium aluminate (MgO . $Al_2O_3$), magnesium chromite (MgO . $Cr_2O_3$), magnesium ferrite (MgO . $Fe_2O_3$), magnesium lanthanate (MgO . $La_2O_3$), magnesium silicate (2MgO . $SiO_2$), magnesium titanate (2MgO . $TiO_2$), magnesium zirconate (MgO . $ZrO_2$), magnesium zirconium silicate (MgO . $ZrO_2 . SiO_2$), nickel aluminate (NiO . $Al_2O_3$), potassium aluminum silicate ($K_2O . Al_2O_3 . 2SiO_2$), strontium aluminate (SrO . $Al_2O_3$), strontium phosphate (3SrO . $P_2O_5$), strontium zirconate (SrO . $ZrO_2$), thorium zirconate ($ThO_2 . ZrO_2$), zinc aluminate (ZnO . $Al_2O_3$), zinc zirconium silicate (ZnO . $ZrO_2 . SiO_2$), and zirconium silicate (zircon - $ZrO . SiO_2$).

Economically preferred refractory metal oxides include: silicon oxide ($SiO_2$), titanium oxide ($TiO_2$), zirconium oxide ($ZrO_2$), magnesium oxide (Mgo), aluminum oxide ($Al_2O_3$), mullite ($3Al_2O_3 \cdot 2SiO_2$) and zircon ($ZrO_2 \cdot SiO_2$). More than one metal oxide can be used in a refractory assembly, e.g., aluminum oxide or zirconium oxide can be used for one course of brick or in a portion of one course of brick and silicon oxide or titanium oxide for another course of brick or in another portion of the same course.

Selection of a particular refractory metal oxide, which includes complex metal oxides, depends on the conditions prevailing within the vessel, e.g., temperature, pressure and chemical environment. Such conditions affect the relative stability of the metal oxide. Price is also a consideration. By matching the environment existing at a particular course of brick, or portion thereof, with the properties of the metal oxide, a suitable refractory metal oxide can be selected. For example, if an oxidizing atmosphere is present in the vessel or a portion thereof, a metal oxide resistant to oxidation at the operating temperatures and chemical environment is used. Similarly, if a reducing atmosphere is present in the vessel or a portion thereof, a metal oxide resistant to reduction at the operating temperatures and chemical environment is used. If both oxidizing and reducing atmospheres are present in different portions of the vessel, two metal oxides can be used, or one metal oxide resistant to both oxidation and reduction can be used. Finally, where the only consideration in selecting a metal oxide is resistance to temperature, any refractory metal oxide having a melting point above the operating temperature of the vessel can be used. In this case, price and availability will be the important factors considered.

The refractory metal oxide should be finely divided and substantially dry. Pigmentary metal oxides are especially suitable. For example, pigmentary titanium dioxide either uncoated or coated with hydrous metal oxides can be used. Typically, the ultimate particle size of pigmentary titanium dioxide ranges from about 0.2 to about 0.5 microns The actual size of the refractory metal oxide used can vary; however, the degree of sub-division of the metal oxide should be sufficient, i.e., the particle size should be sufficiently small, so that the metal oxide will fill the exposed surface pores in the refractory brick. The apparent porosity of refractory brick ranges from about 8 to about 33 percent depending on the particular grade of refractory. Apparent porosity is the ratio of the volume of the pores or voids in a body to the total volume and is based upon the open pore-volume only (as distinguished from the total pore-volume). Thus, by reducing the apparent porosity of the brick, its permeability is also reduced. Since the refractory metal oxide is applied to the refractory brick as a dry powder, the refractory metal oxide does not penetrate the brick to any significant depth. The exact depth will depend to a great extent on the porosity of the brick and will vary across the brick. In accordance with the present method, it is contemplated that the exposed surface pores and/or voids of the refractory brick be filled with the metal oxide to depths obtained by application of the metal oxide to the surface with sufficient pressure to fill the pores and retain the metal oxide therein. Depths of one-sixteenth inch or less, e.g., one-thirty-second inch, can be obtained depending on the porosity of the brick, and the manner of application.

The refractory metal oxide is applied to the refractory brick as a dry powder. By "dry" is meant that the moisture content of the metal oxide is sufficiently low so that the metal oxide retains essentially the properties of a free flowing powder, i.e., the particles of metal oxide do not cohere or stick to each other to any substantial degree. Some refractory metal oxides when exposed to the air will absorb water of hydration and it is not intended to exclude refractory metal oxide in that state provided, however, that the level of absorbed water does not reach the aforementioned level. Pigmentary titanium dioxide, for example, coheres at moisture levels of about 0.5 weight percent. Therefore, a moisture content of less than 0.5 weight percent, e.g., about 0.1 weight percent, is necessary to provide a "dry" titanium dioxide.

The refractory metal oxide can be applied to the refractory brick by any convenient method and at any convenient temperature, i.e., ambient temperature. For example, the metal oxide can be applied manually to the surface of the brick and the excess brushed off. Similarly, the metal oxide can be applied by spraying the metal oxide powder onto the brick with any suitable air gun. It can be applied to the brick before or after a course of brick is constructed. In the last mentioned embodiment, only one of the blind surfaces of the brick will be treated. When spraying is used to apply the refractory metal oxide, it is convenient to add materials to the oxide that make it more free flowing. For example, the addition of from 3 to 5 weight percent silicon oxide ($SiO_2$) to titanium oxide ($TiO_2$) produces a more free flowing titanium oxide.

As used herein, the term "hidden face" or "hidden surface" is intended to mean and include all faces of the refractory brick not visible to the human eye when incorporated into a course (row) of brick or refractory lining. In the case of an inner course of brick, all faces of such brick are considered hidden when the completed refractory lining is viewed. In the case of brick exposed to the very interior of the vessel, all but the exposed face are considered hidden faces.

The term "hot face" is intended to mean the face of a particular brick or single row of bricks having a common planar surface that is closest to the interior of the vessel, i.e., where the process being conducted, e.g., chlorination, takes place. The term "cold face" is intended to mean the face of a particular brick or single row of bricks having a common planar surface that is opposite to the "hot face". Thus, each brick will have a "hot face" and a "cold face". Typically, the "cold face" will be adjacent to the "hot face" of an abutting brick in the same horizontal plane.

The practice of the present method allows for flexibility in treating refractory brick. For example, the surface of the brick can be treated with refractory metal oxide so as to fill substantially all the exposed pores of the brick surface. Any excess remaining on the surface can be easily removed by lightly brushing the surface of the brick. Alternatively, a superfacial coating of metal oxide can be applied to or left on the surface of the brick. Such superficial coating will typically vary from about 0.5 to about 10 mills in thickness. Thicknesses greater than 10 mills, i.e., up to one-eighth inch or one-fourth inch, can be utilized; however, if the coating is too thick, it will flake off and result in a non-uniform surface against which the next abutting course of brick rests. Further, the coatings applied to the various hidden surfaces of the brick need not be uniform, i.e., only an intimate protective coating need be used. Thus, for example, one surface of a brick may have a coating of 5 or 10 mills; while others can have thicker or thinner coatings. This will be especially true when the coatings are applied manually. Uniform coatings are, however, preferred.

The present method is more particularly described in the following examples which are intended as illustrative only, since numerous modifications and variations thereof will be apparent to those skilled in the art.

EXAMPLE I

A mixture of rutile titanium oxide ore and coke was chlorinated in a refractory lined cylindrical fluid bed chlorination vessel. The shell of the vessel was lined with several courses of refractory brick. Portions of each of three types of refractory brick contained in the refractory lining were treated in the manner hereinafter described with pigmentary titanium dioxide. Table I lists the approximate composition of the three types of brick treated in this example. The ultimate particle size of the pigmentary titanium dioxide was between about 0.2 and about 0.3 micron. Each hidden face of test refractory brick was manually coated with the pigmentary titanium dioxide and the excess brushed off. After the bricks in each row were in place, the brick assembly was grouted with the pigmentary titanium dioxide, i.e., each of the exposed joints between the brick was filled with the pigmentary titanium dioxide. Then, the remaining exposed face of each inner row of treated brick was coated with about a one-sixteenth inch layer of the pigmentary titanium dioxide. The brick surface exposed to the interior of the chlorination vessel was not treated with the pigmentary titanium dioxide; however, the joints between the bricks were grouted.

After operating the chlorinator at an operating temperature of about 1800° F. for about 29 days, the chlorinator was shut down and the refractory brick lining was examined. Various segments of untreated brick were found to be about 30 percent corroded and were replaced. After 48 days of total operation, the chlorinator was shut down for a scheduled inspection. The refractory brick lining was again examined and the refractory brick treated with the pigmentary titanium dioxide were found to be substantially unaffected by corrosion

TABLE I

| COMPOUND | Brick A | Brick B | Brick C |
|---|---|---|---|
| $Al_2O_3$ | 45.1 | 46.5 | 42.5 – 45.0 |
| $SiO_2$ | 51.9 | 48.7 | 51.0 – 53.5 |
| $Fe_2O_3$ | 1.4 | 1.8 | 1.0 – 2.0 |
| $TiO_2$ | 1.7 | 2.3 | 1.5 – 2.5 |
| CaO | 0.1 | 0.2 | 0.2 – 0.8 |
| MgO | Trace | 0.2 | 0.1 – 0.6 |
| Alkalies | 0.3 | 0.08 | 0.5 – 1.0 |

EXAMPLE II

Following the scheduled shutdown of the chlorinator of Example I, eroded refractory brick was replaced and treated with pigmentary titanium dioxide in accordance with the procedures of Example I. The chlorinator was operated continuously for 60 days until a scheduled shutdown. Inspection of the refractory lining showed that treated refractory brick suffered little or no deterioration, while untreated brick was substantially eroded.

Examples I and II show that treatment of a dry assembly of refractory brick with refractory metal oxide, e.g., finely divided titanium dioxide, prolongs the life of the refractory brick and permits the operation of the process (chlorination) in the vessel containing the treated refractory for extended periods of continuous operation until scheduled shutdowns.

EXAMPLE III

Refractory brick in the working section of the chlorinator of Example I are treated with finely divided aluminum oxide ($Al_2O_3$) in the manner described in Example I. Other sections of refractory brick in the disengaging section of the chlorinator are treated with pigmentary titanium dioxide in the manner described in Example I. The chlorinator is then operated continuously until a scheduled shutdown. Refractory brick treated with the aluminum oxide and titanium dioxide are then inspected and show little or no deterioration in comparison with untreated refractory brick cemented together with bonding mortar.

EXAMPLE IV

The chlorinator of Example III is operated with zircon treated refractory brick in the working section (instead of aluminum oxide treated brick) and pigmentary titanium dioxide treated brick in the disengaging section until a scheduled shutdown. Results similar to that of Example III are observed.

While there are above described a number of specific embodiments of the present invention, it is obviously possible to produce other embodiments and various equivalent modifications thereof without departing from the spirit of the invention.

Having set forth the general nature and specific embodiments of the present invention, what is claimed is set forth in the appended claims.

I claim:

1. A dry assembly of refractory bricks wherein joints between individual bricks are grouted with material consisting essentially of substantially dry, finely divided, free flowing refractory metal oxide powder having a melting point greater than the temperature to which the refractory brick is exposed, the exposed faces of said grouting consisting essentially of said refractory metal oxide powder.

2. An assembly according to claim 1 wherein the refractory metal oxide is selected from the group consisting of the oxides of silicon, titanium, zirconium, magnesium, aluminum and mixtures thereof.

3. An assembly according to claim 1 wherein the refractory metal oxide is titanium dioxide.

4. An assembly according to claim 3 wherein the titanium dioxide is pigmentary titanium dioxide.

* * * * *